United States Patent [19]

Sugiyama et al.

[11] Patent Number: 4,783,609
[45] Date of Patent: Nov. 8, 1988

[54] ROTATION DETECTING APPARATUS FOR USE WITH COMPRESSOR

[75] Inventors: Seiji Sugiyama; Yoichiro Kashiwagi; Hiroya Kono, all of Kariya; Kazuhito Sakashita, Uji, all of Japan

[73] Assignee: Kabushiki Kaisha Toyoda Jidoshokki Seisakusho, Kariya, Japan

[21] Appl. No.: 71,392

[22] Filed: Jul. 9, 1987

[30] Foreign Application Priority Data

Jul. 11, 1986 [JP] Japan .................. 61-164468

[51] Int. Cl.$^4$ .............. H02K 29/12; F04B 42/06; G01R 33/02
[52] U.S. Cl. .................. 310/168; 62/228.5; 310/208; 336/184; 336/234; 417/222
[58] Field of Search ............ 62/228.4, 228.5; 310/67 R, 89, 152, 153, 155, 208, 268, 68 R, 168, 171; 336/180, 184, 234; 417/222, 223, 269, 15

[56] References Cited

U.S. PATENT DOCUMENTS

| 2,060,881 | 11/1936 | Linthwaite | 310/153 |
| 3,747,036 | 7/1973 | Erdmann | 336/234 |
| 4,056,747 | 11/1977 | Orris et al. | 310/155 |
| 4,393,966 | 7/1983 | Kono et al. | |
| 4,480,961 | 11/1984 | Kono et al. | 417/223 |
| 4,525,670 | 6/1985 | Miyagawa et al. | 310/168 |
| 4,639,670 | 1/1987 | Normann | 310/152 |
| 4,704,072 | 11/1987 | Nakajima et al. | 417/223 |

FOREIGN PATENT DOCUMENTS 56-64184 4/1981 Japan .
56-85582 11/1981 Japan .
58-82083 11/1983 Japan .

Primary Examiner—Patrick R. Salce
Assistant Examiner—D. L. Rebsch
Attorney, Agent, or Firm—Brooks Haidt Haffner & Dalahunty

[57] ABSTRACT

A rotation detecting apparatus disposed on the outer periphery of a compressor including an airtight casing containing a rotor. The rotation detecting apparatus is constituted by plural magnetism detecting elements attached to the outer periphery of the airtight casing of the compressor in correspondence with a rotational orbit of a magnet disposed on the rotor within the airtight casing, such plural magnetism detecting elements each having a core made up of at least one amorphous alloy wire and a coil wound around the outer periphery of the core.

8 Claims, 2 Drawing Sheets

ROTATION DETECTING APPARATUS FOR USE WITH COMPRESSOR

FIELD OF THE INVENTION

The present invention relates to a rotation detecting apparatus for use with a compressor incorporated in an air conditioning system for a vehicle, and more particularly to a rotation detecting apparatus for detecting the nutational or rotary motion of a swash plate within a swash-plate type compressor, the rotation of a rotor within a vane type compressor or the like.

DESCRIPTION OF THE RELATED ART

FIG. 5 shows an example of a known rotation detecting apparatus of this kind. As illustrated, a rotor 1 is airtightly accommodated in a casing 2, a mounting base 3 projects outwardly from the casing 2 and a mounting bore 4 is formed in the center of the mounting base 3. The mounting bores 4 receives a detecting element 5 having a coil 7 which is wound around a soft-iron core 6. The inner end of the detecting element 5 is disposed in the vicinity of and in face-to-face relationship with the orbit of rotation drawn by a magnet 8 disposed on the rotor 1. A sealing ring 9 is fitted in the gap between the aforesaid mounting bore 4 and the detecting element 5 to maintain the airtightness of the interior of the casing 2. The above-described arrangement is disclosed in Japanese Patent Laid-open No. 64184/1981.

In order to achieve a satisfactory capability with respect to detection of the high-speed rotation (for example, 2000 to 3000 rpm) of the rotor 1 within the illustrated rotation detecting apparatus, the detecting element 5 provided with the soft-iron core 6 must be disposed in extremely close relation to the rotational orbit of the magnet 8. Otherwise, it is impossible to exactly detect variations in magnetic flux which might be produced when the magnet 8 passes by the detecting element 5 during rotation of the rotor 1. Accordingly, in order to obtain a proper detection capability, the casing 2, as described above, must be provided with the mounting base 3 and the mounting bore 4 so that the detecting element 5 may be fitted into the mounting bore 4. This makes it impossible to apply the casing 2 of a rotary machine such as a compressor having a rotation detecting apparatus to that having no rotation detecting apparatus, and this leads to the problem of an increase in production costs. Also, air might leak to the interior through the portion occupied by the sealing ring 9 to damage the airtightness of the casing 2. In addition, since the detecting element 5 must be projected to the interior of a compressor, the mounting base 3 and the mounting bore 4 need to be machined. This may result in problems such as a complicated production process, an increase in production costs and the like.

SUMMARY OF THE INVENTION

It is therefore an object of the present invention to provide a rotation detecting apparatus for use with a compressor which is capable of exactly detecting the passage of a magnet during rotation of a rotor even if a magnetism detecting element is attached to the outer surface of a casing which is spaced apart from the rotational orbit of the magnet disposed on the rotor.

It is another object of the present invention to provide a rotation detecting apparatus for use with a compressor which can be applied to the casing of a compressor having no rotation detecting apparatus, without the need for any special machining, thereby enabling a reduction in the production costs.

It is still another object of the present invention to provide a rotation detecting apparatus for use with a compressor in which air is prevented from leaking away through a portion to which detecting elements are attached, thereby enabling effective maintenance of the performance of the compressor.

The above-described objects are achieved by the present invention, providing a magnetism detecting element disposed on the outer periphery of an airtight casing in correspondence with the rotational orbit of a magnet attached to a rotor within the airtight casing, the aforesaid magnetism detecting element having a core made of amorphous alloy and a coil wound around the core.

Further objects, features and advantages of the present invention will become apparent from the following description of a preferred embodiment of the present invention with reference to the accompanying drawings, and the scope of the invention will be indicated in the appended claims. A multiplicity of advantages which are not referred to in the present specification will be readily understood by those skilled in the art by carrying out the present invention without departing from the spirit and scope of the invention.

DETAILED DESCRIPTION OF THE PREFERRED EMBODIMENT

Figure 1:
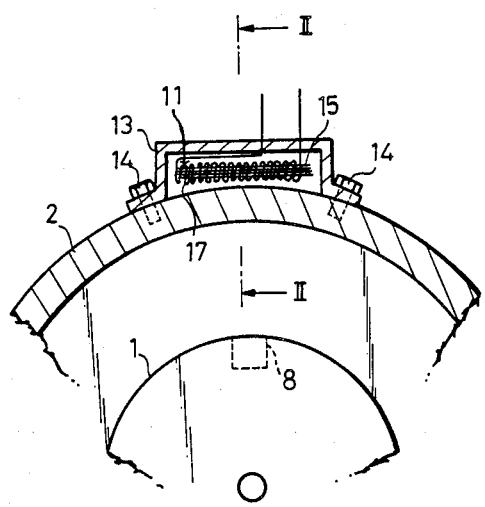
FIG. 1 is a fragmentary, sectional view diagrammatically showing a preferred embodiment of a rotation detecting apparatus in accordance with the present invention.
Figure 2:
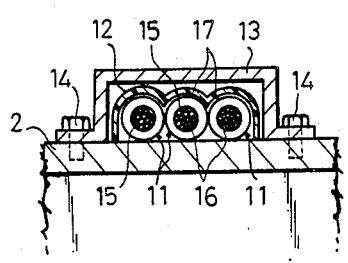
FIG. 2 is a sectional view taken along the line II—II of FIG. 1.
Figure 3:
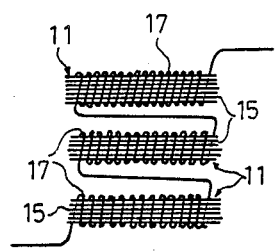
FIG. 3 is a fragmentary, plan view diagrammatically showing the arrangement of magnetism detecting elements in accordance with the present invention.
Figure 4:
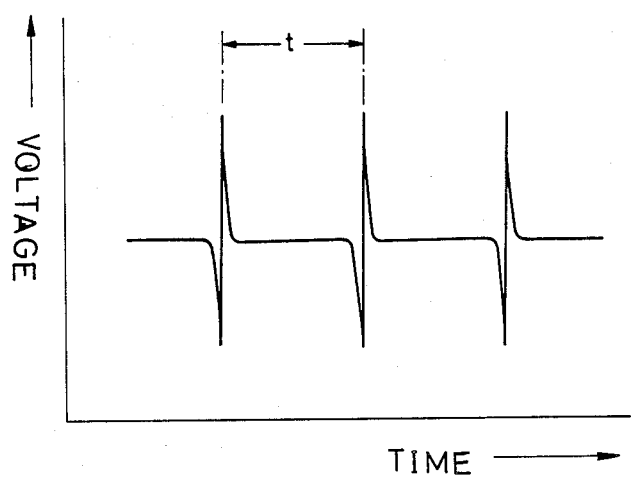
FIG. 4 is a graph showing an electromotive force obtained through the rotation detecting apparatus of the present invention.
Figure 5:
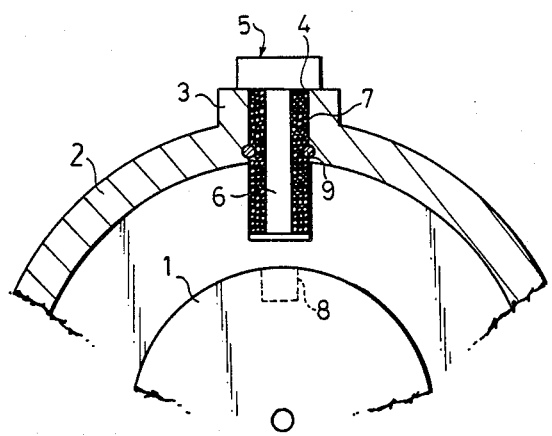
FIG. 5 is a fragmentary, sectional view diagrammatically showing a typical related-art rotation detecting apparatus.

A preferred embodiment of the present invention will be described in detail below with reference to FIGS. 1 to 4.

In the presently preferred embodiment, a rotor 1 is accommodated in an airtight casing 2 of a compressor and the rotor 1 has a magnet 8 on its outer periphery. Magnetism detecting elements 11 are secured by a resin molding 12 to the outer periphery of the casing 2 in correspondence with a rotational orbit drawn by the magnet 8. A magnetism shielding box 13 made of an electrically conductive material is attached by bolts 14 to the casing 2 in such a manner as to cover the magnetism detecting elements 11. The magnetism shielding box 13 shuts off noise which might be produced by the motion of the engine of a vehicle, thereby preventing the noise from affecting the magnetism detecting elements 11.

Each of the aforesaid magnetism detecting elements 11 is composed of: a core constituted by a bundle of plural amorphous alloy wires 15 (in this embodiment, each having a length of 15 to 50 mm), for example, a bundle of ten to fifteen wires (preferably, ten or more wires); a thin-walled tube 16 made of resin such as Teflon or the like which covers the outer periphery of the core; and a coil 17 having a number of turns (about three thousand turns, in this embodiment) on the outer periphery of the tube 16. A plurality of (in this embodiment, three) magnesim detecting elements 11 are disposed adjacent to and in parallel with each other such that their respective cores extend along the circumference of the rotor 1, that is, in the direction of rotation of the rotor 1. It is to be noted that the magnetism detecting elements 11 may be vertically disposed. The coils 17 are connected in series.

The operation of the rotation detecting apparatus having the aforesaid arrangement will be described below.

While the compressor is in motion, each time the magnet 8 disposed on the rotor 1 passes by the underside of the magnetism detecting elements 11, a magnetic field is abruptly varied, and this causes an increase and a decrease in the intensity thereof. At this time, although the magnetism detecting elements 11 constituting the presently preferred embodiment, each having the core made of the amorphous alloy wires 15, are disposed on the outer periphery of the casing 2 spaced apart from the rotational orbit of the magnet 8, the transition of magnetic flux is abruptly caused and thus an electromotive force is produced in the form shown in FIG. 4.

Accordingly, if this electromotive force is observed by means of an oscillograph, it is possible to continuously read the rotational speed of the compressor on the basis of a time interval t between generations of such electromotive force. Also, while the compressor is in regular motion, the aforesaid electromotive forces are periodically produced. However, in a case where the anomalous stop of the compressor occurs due to accidents such as the seizure of slidable portions or the damage or breakage of constituent components or the like, no electromotive force is produced. Thus, if the same electromotive force is supplied via a pulse detector or the like to a solenoid clutch provided between the compressor and a drive source, drive input is shut off immediately after the aforesaid anomalous of the compressor. It is thus possible to protect a drive system and the associated mechanism.

Also, in the presently preferred embodiment, the magnetism detecting elements 11 are attached to the outer periphery of the casing 2, and no mounting bore is formed in the casing 2. This eliminates a likelihood that air leaks to the interior of the casing 2 through a portion occupied by the magnetism detecting elements 11. It is thus possible to positively prevent deterioration in the performance of the compressor due to air leakage.

As described in detail above, in accordance with the present invention, even if the magnetism detecting elements are attached to the outer periphery of the casing, spaced apart from the rotational orbit of the magnet disposed on the rotor, it is possible to accurately detect the passage of the magnet while the rotor is rotating. In addition, it is not necessary to add any special mounting base or mounting bore to the casing. Thus, the present invention can be applied to the casing of a compressor having no rotation detecting apparatus without the need for special working. This enables a reduction in production costs and produces a proper effect, in that it is possible to maintain the performance of the compressor for a long period of time by preventing air from leaking to the interior of the casing through the portion occupied by the detecting elements.

While this invention has been described in conjunction with a specific embodiment thereof, it is evident that the various structural and operational features disclosed may be modified and changed in a number of ways, none of which involves any departure from the spirit and scope of the invention as defined in the hereto appended claims.

What is claimed is:

1. A rotation detecting apparatus for use with a compressor comprising a plurality of magnetism detecting elements disposed adjacent and in parallel with each other attached to the outer periphery of an airtight casing of said compressor in correspondence with a rotational orbit of a magnet disposed on a rotor within said airtight casing, said magnetism detecting elements each having a core made up of amorphous alloy and a separate coil wound around the outer periphery of each said core, said coils being connected in series aiding relationship.

2. A rotation detecting apparatus for use with a compressor according to claim 1, wherein said amorphous alloy cores are each formed from amorphous alloy wire.

3. A rotation detecting apparatus for use with a compressor according to claim 2, wherein said magnetism detecting elements are disposed with said cores extending in the direction of rotation of said rotor.

4. A rotation detecting apparatus for use with a compressor according to claim 3, wherein each said core is consists of a bundle of said amorphous alloy wires.

5. A rotation detecting apparatus for use with a compressor according to claim 4, wherein said core of each of said magnetism detecting elements is covered with a thin tube made of resin, said coil being wound around said tube.

6. A rotation detecting apparatus for use with a compressor according to claim 2, wherein each said core consists of a bundle of said amorphous alloy wires.

7. A rotation detecting apparatus for use with a compressor according to claim 6, wherein said core of each of said magnetism detecting elements is covered with a thin tube made of resin, said coil being wound around said tube.

8. A rotation detecting apparatus for use with a compressor according to claim 2, wherein a magnetism shielding box covers said magnetism detecting element so as to exclude magnetic noise from outside said compressor thereby preventing said noise from affecting said magnetism detecting element.

* * * * *